US012649692B2

(12) United States Patent
Hemphill et al.

(10) Patent No.: US 12,649,692 B2
(45) Date of Patent: Jun. 9, 2026

(54) COATED GYPSUM SET STABILIZING PARTICLES HAVING A HYDROPHOBIC GYPSUM CORE, GYPSUM BOARD INCLUDING SAME, PROCESS FOR MAKING THE PARTICLES, AND PROCESS FOR MAKING THE GYPSUM BOARD

(71) Applicant: KNAUF GIPS KG, Iphofen (DE)

(72) Inventors: Mark K. Hemphill, Hawthorn Woods, IL (US); Naser Aldabeibeh, Homer Glen, IL (US); Mark Antosh, Wheeling, IL (US)

(73) Assignee: KNAUF GIPS KG, Iphofen (DE)

( * ) Notice: Subject to any disclaimer, the term of this patent is extended or adjusted under 35 U.S.C. 154(b) by 231 days.

(21) Appl. No.: 18/349,513

(22) Filed: Jul. 10, 2023

(65) Prior Publication Data

US 2024/0182363 A1     Jun. 6, 2024

Related U.S. Application Data

(60) Provisional application No. 63/385,679, filed on Dec. 1, 2022.

(51) Int. Cl.
*C04B 28/14*          (2006.01)
*B28B 19/00*          (2006.01)
          (Continued)

(52) U.S. Cl.
CPC .......... C04B 28/14 (2013.01); B28B 19/0092 (2013.01); C04B 24/02 (2013.01);
          (Continued)

(58) Field of Classification Search
CPC ......... C04B 28/14; C04B 24/02; C04B 24/06; C04B 24/10; C04B 24/34; C04B 24/42;
          (Continued)

(56) References Cited

U.S. PATENT DOCUMENTS 2,078,199 A * 4/1937 King ...................... C04B 28/14
                                                    106/785
3,573,947 A   4/1971 Kinkade et al.
          (Continued)

FOREIGN PATENT DOCUMENTS

CA          371290 A     1/1938
CN     113501701 A    10/2021
          (Continued)

OTHER PUBLICATIONS

International Search Report and Written Opinion of the International Searching Authority mailed Feb. 5, 2024 to United States Gypsum Company for International Application No. PCT/US2023/080898 filed Nov. 22, 2023.

*Primary Examiner* — Christopher W Raimund
(74) *Attorney, Agent, or Firm* — Vorys, Sater, Seymour and Pease LLP; Maryellen Feehery Hank; Anthony P. Venturino

(57)          ABSTRACT

A plurality of set stabilizer particles including: a particle core including 50 to 98 wt. %, preferably 70 to 98 wt. % or 70 to 95 wt. %, calcium sulfate dihydrate and 0.05 to 10 wt. %, preferably 0.5 to 5 wt. %, hydrophobic material selected from wax and/or siloxane, and a coating on the particle core, the coating including a dehydration-preventing substance selected from sugars, dextrins, and polyhydroxy alcohols, such as glycerol or polyglycols, at a ratio of about 5 to 25 parts by weight of dehydration-preventing substance per 100 parts by weight of calcium sulfate dihydrate. Methods of making and using the set stabilizer particles are also disclosed.

17 Claims, 3 Drawing Sheets

(51) Int. Cl.

| | |
|---|---|
| *C04B 24/02* | (2006.01) |
| *C04B 24/06* | (2006.01) |
| *C04B 24/10* | (2006.01) |
| *C04B 24/34* | (2006.01) |
| *C04B 24/42* | (2006.01) |
| *C04B 38/10* | (2006.01) |
| *C04B 40/06* | (2006.01) |
| *C04B 103/00* | (2006.01) |
| *C04B 103/12* | (2006.01) |
| *C04B 103/22* | (2006.01) |
| *C04B 111/00* | (2006.01) |

(52) U.S. Cl.
CPC .............. *C04B 24/06* (2013.01); *C04B 24/10* (2013.01); *C04B 24/34* (2013.01); *C04B 24/42* (2013.01); *C04B 38/10* (2013.01); *C04B 40/0641* (2013.01); *C04B 2103/0052* (2013.01); *C04B 2103/12* (2013.01); *C04B 2103/22* (2013.01); *C04B 2111/0062* (2013.01)

(58) Field of Classification Search
CPC ................ C04B 38/10; C04B 40/0641; C04B 2103/0052; C04B 2103/12; C04B 2103/22; C04B 2111/0062; C04B 28/145; C04B 20/1022; B28B 19/0092
See application file for complete search history.

(56) References Cited

U.S. PATENT DOCUMENTS

| | | | |
|---|---|---|---|
| 4,681,644 | A | 7/1987 | Dozsa |
| 5,643,510 | A | 7/1997 | Sucech |
| 5,683,635 | A | 11/1997 | Sucech et al. |
| 6,342,284 | B1 | 1/2002 | Yu et al. |
| 6,379,458 | B1 | 4/2002 | Immordino et al. |
| 6,409,825 | B1* | 6/2002 | Yu ........................... C04B 28/14 |
| | | | 106/776 |
| 6,494,609 | B1 | 12/2002 | Wittbold et al. |
| 6,632,550 | B1 | 10/2003 | Yu et al. |
| 6,815,049 | B2 | 11/2004 | Veeramasuneni et al. |
| 6,874,930 | B2 | 4/2005 | Wittbold et al. |
| 7,364,676 | B2 | 4/2008 | Sucech et al. |
| 8,226,766 | B2 | 7/2012 | Veeramasuneni et al. |
| 8,323,785 | B2 | 12/2012 | Yu et al. |
| 9,540,287 | B2 | 1/2017 | Aldabaideh et al. |
| 9,945,119 | B2 | 4/2018 | Aldabaideh et al. |
| 10,570,062 | B2 | 2/2020 | Piwowarski |
| 10,850,425 | B2 | 12/2020 | Yu et al. |
| 11,186,066 | B2 | 11/2021 | Hemphill et al. |
| 2007/0246683 | A1 | 10/2007 | Miller et al. |
| 2010/0247937 | A1 | 9/2010 | Liu et al. |
| 2012/0168527 | A1 | 7/2012 | Li et al. |
| 2012/0170403 | A1 | 7/2012 | Li et al. |
| 2016/0214895 | A1 | 7/2016 | Van Strien et al. |
| 2018/0030729 | A1* | 2/2018 | Aldabaibeh ............ B05D 1/305 |
| 2018/0305257 | A1* | 10/2018 | Lu ........................... C04B 28/14 |
| 2019/0322584 | A1 | 10/2019 | Sang et al. |
| 2021/0188712 | A1 | 6/2021 | Gehrig et al. |
| 2021/0331978 | A1* | 10/2021 | Schermann ........... C04B 18/167 |
| 2022/0194856 | A1 | 6/2022 | Li et al. |

FOREIGN PATENT DOCUMENTS

| | | |
|---|---|---|
| CN | 114477936 A | 5/2022 |
| EP | 2030693 B1 | 3/2009 |
| EP | 2641886 A2 | 9/2013 |
| EP | 3055113 | 8/2016 |
| JP | H0818106 B2 | 2/1996 |
| JP | 09165244 A | 6/1997 |
| WO | 2009064602 A1 | 5/2009 |
| WO | 2015051822 A1 | 4/2015 |
| WO | 2019001677 A1 | 1/2019 |
| WO | 2019081344 A1 | 5/2019 |

* cited by examiner

COATED GYPSUM SET STABILIZING PARTICLES HAVING A HYDROPHOBIC GYPSUM CORE, GYPSUM BOARD INCLUDING SAME, PROCESS FOR MAKING THE PARTICLES, AND PROCESS FOR MAKING THE GYPSUM BOARD

FIELD OF THE INVENTION

The present disclosure relates to methods of reusing gypsum board waste. The present invention relates to set stabilizing particles including a coating and a core of reclaimed gypsum particles containing hydrophobic material, such as siloxane, useful for stabilizing the setting time of calcium sulfate hemihydrate cements and plasters against the influence of admixtures of substances which may have either an accelerating or a retarding effect, as well as against the effect of temperatures above normal. The present invention also relates to methods for making the set stabilizing particles and to gypsum boards including the set stabilizing particles.

BACKGROUND OF THE INVENTION

In the construction of buildings, one of the most common building elements is gypsum boards, also known as gypsum paneling, gypsum building panels, gypsum panels, or wallboard, used in the construction of walls and/or ceilings. Walls made from gypsum wallboard are traditionally constructed by affixing the panels to wood studs or metal framing, and treating the joints between adjoining panels with a specially prepared adhesive called a joint compound.

The gypsum board is primarily made of gypsum as opposed to cement boards which are primarily a cement, such as Portland cement. In particular, gypsum boards are primarily composed of calcium sulfate dihydrate. The gypsum boards are made by reacting water and stucco (calcium sulfate hemihydrate) such that the calcium sulfate hemihydrate sets to form calcium sulfate dihydrate (gypsum). Stucco is made by calcining gypsum, and it is typically comprised primarily of calcium sulfate hemihydrate and can also contain calcium sulfate anhydrite. The calcium sulfate hemihydrate is produced by calcination of calcium sulfate dihydrate to partially dehydrate the calcium sulfate dihydrate.

When stucco is mixed with water, calcium sulfate hemihydrate particles react, rehydrating to become set gypsum. The manufacturing method of the gypsum panels typically involves depositing an aqueous gypsum slurry (e.g., a mixture containing stucco and water). Optionally, one or more additives may be added to the slurry. Additives may include, for example, retarders, accelerators, foaming agents, wet strength enhancing materials, biocides, sag resistant ingredients, cellulosic fibers, glass fibers, fire retarding materials, binders, water repellency ingredients, dust mitigators, starches, as well as other ingredients or enhancing materials that are known in the art.

Set retarders (up to about 2 lb./MSF (9.8 g/m$^2$)) or dry accelerators (up to about 35 lb./MSF (170 g/m$^2$)) are added to modify the rate at which the hydration reactions take place.

A typical set accelerator is set stabilizer particles of calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Typically this accelerator may be included in the gypsum slurry used to make a gypsum board in an amount of 0.5-2 wt. % of the slurry on a dry (water free) basis.

The gypsum slurry is typically deposited onto a moving continuous facer sheet of paper or fibrous mat, then the slurry is covered with another facer sheet of paper or fibrous mat, such that the aqueous gypsum slurry, that will form the gypsum core, is between the two facing materials. To reduce the overall weight of the finished gypsum board, air may be incorporated as bubbles or air pockets into the aqueous gypsum slurry resulting in a gypsum board having a foamed or bubbled gypsum core having air voids (also called air bubbles). The gypsum slurry is allowed to set (e.g., to form an interlocking matrix of calcium sulfate dihydrate, referred to as set gypsum) to produce a solid article prior to being cut into panels and sent to a kiln for final drying. The produced gypsum board may be further processed, as is known in the art, and then bundled, and made ready for shipment.

Gypsum boards may enter the solid waste stream in several different locations. Non-limiting examples include waste from a manufacturing facility, waste from new construction sites, renovation waste, and waste from building demolition or deconstruction. In general the waste gypsum materials comprise gypsum-containing material, typically a layer or core, and one or more facer sheets. Waste gypsum materials comprising calcium sulfate dihydrate include gypsum board, for example, interior drywall, exterior sheathing panels, and tile backer board. Also, waste materials comprising gypsum include specialty gypsum board products that may comprise fiberglass-reinforced gypsum cores or be externally coated with fiberglass to strengthen the board and enhance moisture resistance. Waste material comprising calcium sulfate dihydrate may also comprise components such as fibrous woven or unwoven layers comprising paper, glass fibers, mineral fibers, polymers or the like. In particular, the gypsum board generally has a gypsum core and front and back facer sheets of paper, non-woven fibrous mat, or fiber mesh. The fibers of the non-woven fibrous mat or fiber mesh are typically glass fibers, mineral fibers or polymer fibers, most typically glass fibers. Generally the core layer of the waste gypsum material is more than 50 wt. % gypsum.

Methods for reclamation of gypsum from gypsum board are known.

Methods for producing gypsum boards are well-known. For example, Published European patent application EP 2 641 886 A2 describes a gypsum powder containing hemihydrate gypsum powders and type II anhydrous gypsum powders. The type II anhydrous gypsum is obtained by calcining dihydrate gypsum recovered from gypsum board waste. EP 2 641 886 A2 describes further that a part of the type II anhydrous gypsum may be replaced by dihydrate. Also, this dihydrate may be obtained from recycling material. Powders of gypsum board waste are obtained by pulverizing board waste and passing the pulverized product through a sieve to remove the board papers.

EP 2 030 693 B1 also describes recycling of gypsum products in which devices (such as sieves) are provided in order to separate the paper waste from the rest of the gypsum product waste.

Published Patent Cooperation Treaty application WO 2009/064602 A1 describes wet grinding a dihydrate together with a specific dispersant. The ground gypsum is to be used for cosmetics, paper or coatings as a filler. However, WO 2009/064602 A1 is not related to recycling of gypsum product waste.

Published Patent Cooperation Treaty application WO 2019/001677 A1 (Knauf GIPS KG) discloses a method of producing a gypsum slurry for forming gypsum products, in particular gypsum boards, preferably gypsum paper boards, comprising the steps of: a) providing a gypsum paper product comprising a gypsum and a paper component, in particular a gypsum paper board, and/or broken parts thereof; b) wet grinding the gypsum paper product and/or the broken parts thereof containing at least parts of the paper component to form a wet ground gypsum paper component. Its method disintegrates (grinds) the gypsum paper product together with the paper component (i.e. without a previous removal of the paper component). It also includes (directly) feeding the preferably (non-calcined) ground material into a gypsum slurry for forming (new) gypsum products.

In another method for reclamation of gypsum from gypsum board, after separating the gypsum core, the board is typically ground to a particle size of about 300 μm or less (e.g., D50 of about 10 μm to 200 μm, for example 10 μm to 60 μm) then calcined to dehydrate the calcium sulfate dihydrate to calcium sulfate hemihydrate. This calcium sulfate hemihydrate may then be reused in new product.

U.S. Pat. No. 10,570,062 discloses a method for producing a gypsum plasterboard wherein bundler dust which is added to the gypsum slurry is obtained from the production process of impregnated plasterboards using a hydrophobic agent, namely silicone oil.

Published Patent Cooperation Treaty application WO 2019/081344A1 teaches a recycled gypsum with a foaming agent which is at least one alpha-sulfofatty acid di-salt for reducing the wet density of the composition with a recycled gypsum content of at least 0.5 wt. %.

Japanese Patent Application Publication No. JP09165244 A discloses gypsum plasterboard material which contains 3 wt. % or less of a pulverized waste gypsum material. The pulverized waste gypsum material is ground by the grinding energy of from 3-15 kw/gypsum board waste such that there is 1.0-4.0 $m^2$/g BET specific surface area.

U.S. Patent Application Publication 2016/0214895 discloses a method and apparatus for recycling gypsum board which includes grinding the raw material into chunks, crushing the material further in a rolling mill which will reduce material sizes as well as partially knock gypsum off its backing paper. Material is then screened such that only gypsum material is then deposited into a hopper prior to a mixer assembly which mixes the various sizes of recycled gypsum into a consistent mixture prior to passing such material into a roll press subsystem for densifying such material to produce material of known and uniform composition suitable for cement manufacturing. Reclaimed gypsum in this specific physical form factor may then be used in significant portions as replacement for virgin gypsum in cement manufacture. The method and apparatus are applicable to the recycling of both new and renovation gypsum-based building material.

US published patent application No. 2021/0331978 to Schermann et al. discloses a method for making a gypsum board including: combining a first plurality of particles including at least about 50 wt. % calcium sulfate dihydrate and about 0.05 wt. % to about 10 wt. % hydrophobic material and having a D50 particle size of about 200 μm to about 800 μm with a second plurality of particles including calcium sulfate hemihydrate to form a combined mixture of calcium sulfate; adding water to the combined mixture of calcium sulfate to make an aqueous gypsum slurry; depositing a core layer including the aqueous gypsum slurry over a forming surface; and allowing the core layer to set, thereby forming a set gypsum core. Particle size distribution (e.g., D50) may be determined using means known in the art as well. For example, one non-limiting example is disclosed in ASTM D6913/D6913M-17 Method B, Standard Test Methods for Particle-Size Distribution (Gradation) of Soils Using Sieve Analysis.

While the above-described processes are relatively straightforward, the reclamation process becomes difficult when recycling gypsum boards comprising gypsum and hydrophobic material additive. The hydrophobic material additives in the waste gypsum material may be a coating on the outer surface of the gypsum core and/or may be a component within the gypsum core. Typical hydrophobic materials are siloxane or waxes. Thus, the hydrophobic additive in the waste gypsum material may be, for example, a siloxane-containing component. Hydrophobic materials tend to repel water, fail to mix with water, and/or have limited wettability with water. It is the opposite of a hydrophilic material which has a tendency to mix with, dissolve in, and/or be wetted by water.

Attempts to recycle siloxane-containing gypsum, for example, have been unsuccessful as the siloxane-containing gypsum particles interfere with the setting process of the gypsum, especially when the incorporation of air bubbles in the gypsum board structure is desired. Siloxane is detrimental when using such reclaimed particles to make new gypsum panels because the siloxane-containing gypsum particles interfere with the incorporation of air bubbles (foaming) in the gypsum slurry. The incorporation of air bubbles (foaming) in the gypsum slurry is for making light weight gypsum board.

Thus, these siloxane-containing gypsum board products are not usually recyclable and are discarded as waste or a best blended in small amounts, to have less than 1 wt. % reclaimed siloxane-containing gypsum in a gypsum board made from a mixture of reclaimed calcined gypsum comprising siloxane and gypsum not comprising siloxane.

Therefore, there is a need in the art to develop improved methods of use of gypsum particles that contain hydrophobic components.

SUMMARY OF THE INVENTION

The present invention relates to set stabilizer particles comprising
  a particle core comprising 50 to 98 wt. %, preferably 70 to 98 wt. % or 70 to 95 wt. %, calcium sulfate dihydrate and 0.05 to 10 wt. %, preferably 0.5 to 5 wt. %, hydrophobic material selected from wax and/or siloxane, and
  a coating on the particle core, the coating comprising a dehydration-preventing substance selected from the group consisting of sugars, dextrins, and polyhydroxy alcohols, such as glycerol or polyglycols, at a ratio of about 5 to 25 parts by weight of dehydration-preventing substance per 100 parts by weight of calcium sulfate dihydrate.
The present invention relates to a method for making set stabilizer particles of the invention from waste gypsum board material. The set stabilizer particles suitable for use in making new gypsum board having a foamed core. The method comprising:
  applying to feed particles of waste gypsum board material, comprising 50 to 98 wt. % calcium sulfate dihydrate and 0.05 to 10 wt. % hydrophobic material selected from wax and/or siloxane, a dehydration-preventing substance selected from the group consisting of sugars, dextrins, and polyhydroxy alcohols, such as glycerol or polyglycols, at a ratio of about 5 to 25 parts by weight of dehydration-preventing substance per 100 parts by weight of calcium sulfate dihydrate to produce set stabilizer particles, wherein the applying is typically coating by any suitable mechanical or chemical means, for example by grinding or spray coating the feed particles of waste gypsum board material with the dehydration-preventing substance.

The present invention relates to a cementitious powder comprising:

stucco particles comprising calcium sulfate hemihydrate, wherein at least 60 wt. %, preferably at least 70 wt. %, more preferably at least 80 wt. %, typically at least 90 wt. % or typically at least 95 wt. % of the cementitious powder is calcium sulfate hemihydrate; and 0.5-5 wt %, preferably 0.5 to 4 wt %, more preferably 0.5-2 wt % or 0.5-1.5 wt %, the set stabilizer particles of the invention.

The set stabilizer particles act as seed crystals to promote setting of the calcium sulfate hemihydrate. Thus, they act as set accelerators.

The present invention relates to a plaster comprising:
particles comprising calcium sulfate hemihydrate;
set stabilizer particles of any of claims 1 to 10;
optionally a retarder, preferably the retarder comprises sodium citrate.

The present invention also provides a method for using the set stabilizer particles of the invention to manufacture a gypsum board comprising:

preparing an aqueous gypsum slurry comprising a mixture of water, stucco and the set stabilizer particles, wherein the stucco comprises calcium sulfate hemihydrate, wherein the aqueous gypsum slurry comprises a mixture of:

at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, 0.5-5 wt %, preferably 0.5 to 4 wt %, more preferably 0.5-2 wt % or 0.5-1.5 wt %, the set stabilizer particles, 0 to 5 wt. % on a dry (water free) basis, preferably an absence of, hydrophobic material selected from wax and/or siloxane other than hydrophobic material provided by the set stabilizer particles, typically an absence of siloxane other than siloxane provided by the set stabilizer particles and an absence of wax, other than wax provided by the set stabilizer particles, and the water at a weight ratio of water to the calcium sulfate hemihydrate of 0.2:1 to 1.2:1; and depositing a front cover sheet, over a forming surface;

depositing the aqueous gypsum slurry over the front cover sheet to form a layer of the aqueous gypsum slurry, preferably the aqueous gypsum slurry being deposited for the core layer is foamed aqueous gypsum slurry;

depositing a back cover sheet over the aqueous gypsum slurry; and setting the calcium sulfate hemihydrate to form a panel comprising a gypsum core comprising calcium sulfate dihydrate; and drying the panel and cutting the panel into a gypsum board having one or more pre-determined dimensions.

A gypsum board is a gypsum product having a board shape (i.e., being in particular, at least substantially flat). The gypsum board typically has a rectangular shape.

The invention also encompasses a gypsum board made by the method of the present invention.

The invention also encompasses a gypsum board made by the setting a composition comprising a slurry comprising a mixture of:

water;

particles comprising calcium sulfate hemihydrate;

set stabilizer particles of the invention;

optionally a retarder, preferably the retarder comprises sodium citrate.

DETAILED DESCRIPTION OF THE INVENTION

Figure 1:
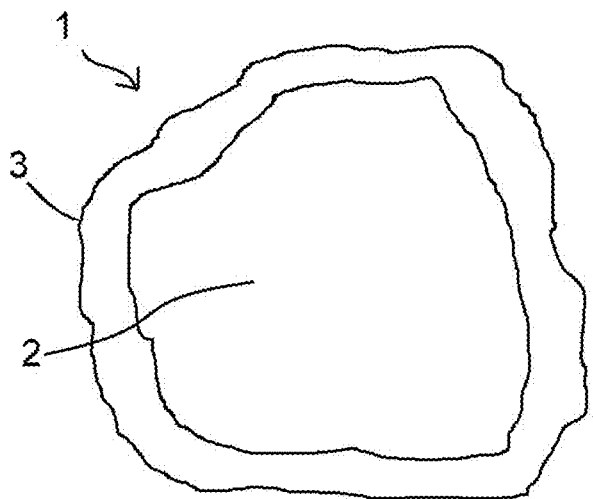
FIG. 1 shows a set stabilizer particle.

The present invention comprises methods that may be used to recycle waste gypsum materials, such as gypsum boards. The waste gypsum boards may comprise hydrophobic materials, such as used in applications to improve moisture resistance of the gypsum board.

In the present description, drywall, used in the construction of interior walls and ceilings (interior wallboard), will be exemplified as a non-limiting example of the waste gypsum material and the product to be made from the recycled gypsum. Drywall for purposes of this specification is defined as a panel (also known as board) comprising a core of calcium sulfate dihydrate, typically with additives, typically between sheets of front and back facer sheets. Typically the facer sheets are made of paper or glass fiber mats, but facer sheets of other fibrous sheets may be employed. However, the processes disclosed herein may be used to process and reclaim gypsum from any gypsum board having a core layer of gypsum-containing material and to produce a building product of any gypsum board having a core layer of gypsum-containing material.

One of skill in the art would be able to modify the methods described herein to process waste gypsum materials from interior wallboard having a gypsum core between paper facer sheets, exterior sheathing gypsum panels, gypsum tile backer board, or other gypsum building panels. For example, a typical gypsum exterior sheathing panel for processing according to the invention may comprise, from front to back, a first fibrous mat, a gypsum core layer having front and rear surfaces, the gypsum core layer having a thickness of about 0.25 inches to about 1.25 inches, preferably about 0.25 inches to about 1 inch, wherein the first fibrous mat is attached as a facer cover sheet to the front surface of the gypsum core layer, a second fibrous mat attached as a backer cover sheet to the rear surface of the gypsum core layer. The gypsum core layer comprises more than about 50 wt. % calcium sulfate dihydrate, preferably at least about 75 wt. % more preferably at least about 85 wt. %. The first fibrous mat and second fibrous mat may comprise paper or fibrous material (e.g., one or more of polymer fibers, glass fibers, and mineral fibers).

Waste gypsum materials may be obtained from a variety of sources. Non-limiting examples include waste from a manufacturing facility, waste from new construction sites, renovation waste, and waste from building demolition or deconstruction. In general the waste gypsum materials comprise gypsum-containing material, typically a layer or core, and one or more facer sheets. Waste gypsum materials comprising calcium sulfate dihydrate include gypsum board, for example, interior drywall, exterior sheathing panels, and tile backer board. Also, waste materials comprising gypsum include specialty gypsum board products that may comprise fiberglass-reinforced gypsum cores or be externally coated with fiberglass to strengthen the board and enhance moisture resistance. Waste material comprising calcium sulfate dihydrate may also comprise components such as fibrous woven or unwoven layers comprising paper, glass fibers, mineral fibers, polymers or the like. In particular, the gypsum board generally has a gypsum core and front and back facer sheets of paper, non-woven fibrous mat, or fiber mesh. The fibers of the non-woven fibrous mat or fiber mesh are typically glass fibers, mineral fibers or polymer fibers, most typically glass fibers. Generally the core layer of the waste gypsum material is more than 50 wt. % gypsum.

In one aspect, the present invention includes a process for converting waste gypsum materials comprising a hydrophobic additive into gypsum suitable for reuse in new gypsum building materials.

The hydrophobic siloxane material additives in the waste gypsum material may be a coating on the outer surface of the gypsum core of a waste gypsum board and/or may be a component within the gypsum core of a waste gypsum board. The waste gypsum material comprises up to about 10 wt. %, for example about 0.05 wt. % to about 10 wt. %, or about 0.05 wt. % to about 5 wt. %, or about 0.1 wt. % to about 5 wt. %, or about 0.5 wt. % to about 2 wt. %, for example 1 wt. %, hydrophobic siloxane material. Thus, by weight, a solid layer of gypsum core in the waste gypsum material may comprise up to about 10 wt. %, for example about 0.05 wt. % to about 10 wt. % or about 0.1 wt. % to about 5 wt. %, or about 0.5 wt. % to about 2 wt. %, for example 1 wt. %, of the hydrophobic siloxane material. For example, a lower limit of hydrophobic siloxane material may be about 0.05 wt. %, about 0.1 wt. %, about 0.5 wt. %, or about 1 wt. % of the gypsum-containing material. For example, an upper limit of hydrophobic siloxane material may be about 2 wt. %, about 3 wt. %, about 5 wt. %, about 7 wt. %, or about 10 wt. % of the gypsum-containing material. Typical hydrophobic materials are siloxane and/or waxes, more typically siloxane. About 1% siloxane in the waste is a typical value.

Set Stabilizing Particles Made from Reclaimed Hydrophobic Gypsum Board Waste

The present invention relates to set stabilizer particles comprising
- a particle core comprising 50 to 98 wt. %, preferably 70 to 98 wt. % or 70 to 95 wt. %, calcium sulfate dihydrate and 0.05 to 10 wt. %, preferably 0.5 to 5 wt. %, hydrophobic material selected from wax and/or siloxane, and
- a coating on the particle core, the coating comprising a dehydration-preventing substance selected from the group consisting of sugars, dextrins, and polyhydroxy alcohols, such as glycerol or polyglycols, at a ratio of about 5 to 25 parts by weight of dehydration-preventing substance per 100 parts by weight of calcium sulfate dihydrate.

The present invention provides set stabilizing particles having a particle substrate or core comprising calcium sulfate dihydrate and hydrophobic material and an amount of a dehydration-preventing substance. FIG. 1 shows a drawing of a typical set stabilizing particle 1 having a particle substrate or core 2 comprising calcium sulfate dihydrate and hydrophobic material and a full or partial coating 3 comprising a dehydration-preventing substance applied to the substrate or core 2.

The particle substrate or core comprising calcium sulfate dihydrate is typically a seed crystal for use to promote setting of calcium sulfate hemihydrate. The dehydration-preventing substance typically has the faculty of preventing the loss of the water of crystallization of the calcium sulfate dihydrate seed crystals. A large number of substances are suitable for this dehydration-preventing substance. They may be exemplified by the general group of water soluble carbohydrates known as sugar, although materials intermediate between starch and sugar, such as the more soluble dextrins, as for example British gum will also be operative for the present purpose. Other materials which have been found to be efficacious for the prevention of loss of water of hydration from the seed crystals are polyhydric alcohols such as glycerol, glycol and the polyglycols. Typical dehydration-preventing substances are ordinary dextrose or glucose, particularly in the commercial form known as corn sugar.

The present invention relates to a method for making set stabilizer particles of the invention from waste gypsum board material. The set stabilizer particles are suitable for use in making new gypsum board having a foamed core. The method comprising:
- applying to feed particles of waste gypsum board material, comprising 50 to 98 wt. % calcium sulfate dihydrate and 0.05 to 10 wt. % hydrophobic material selected from wax and/or siloxane, a dehydration-preventing substance selected from the group consisting of sugars, dextrins, and polyhydroxy alcohols, such as glycerol or polyglycols, at a ratio of about 5 to 25 parts by weight of dehydration-preventing substance per 100 parts by weight of calcium sulfate dihydrate to produce set stabilizer particles,
- wherein the applying is typically coating by any suitable mechanical or chemical means, for example by grinding or spray coating the feed particles of waste gypsum board material with the dehydration-preventing substance.

Typically the set stabilizer particles are compounded in the proportions of 100 parts by weight of calcium sulfate dihydrate crystals in finely divided form as particle cores and 5 to 25 parts by weight of a dehydration-preventing substance selected from the group consisting of sugars, dextrins, and polyhydroxy alcohols, such as glycerol or polyglycols to coat the particle cores, wherein the calcium sulfate dihydrate seed crystals comprise 50 to 98 wt. % calcium sulfate dihydrate and 0.05 to 10 wt. % hydrophobic material selected from wax and/or siloxane, typically siloxane. A gypsum source containing hydrophobic material is ground to make the seed crystals that will form the cores of the set stabilizer particles of the invention. The sugars, dextrins, and polyhydroxy alcohols, such as glycerol or polyglycols, are added to the seed crystals to protect them from high temperature during the grinding process.

The incorporation of the dehydration-preventing substance with the calcium sulfate dihydrate seed crystals to make the set stabilizer particles of the invention is a separate operation prior to mixing the seed crystals with calcium sulfate hemihydrate to make a gypsum board.

For example, the calcium sulfate dihydrate seed crystals may be thoroughly mixed with the dehydration-preventing substance in the form of an aqueous solution, if necessary, or directly in case glycerol or glycol be used, whereafter the latter is dried to remove the added solvent, such as water. If the dehydration-preventing substance material is soluble in an organic liquid such as alcohol or ether, such a substance may be used as a diluent or solvent and then allowed to evaporate. One way of accomplishing this result is to take the calcium sulfate dihydrate seed crystal material and, while in powdered condition, spray it with a solution or dispersion of the dehydration-preventing substance either previously to or coincidentally with the grinding or mixing thereof.

Figure 2:
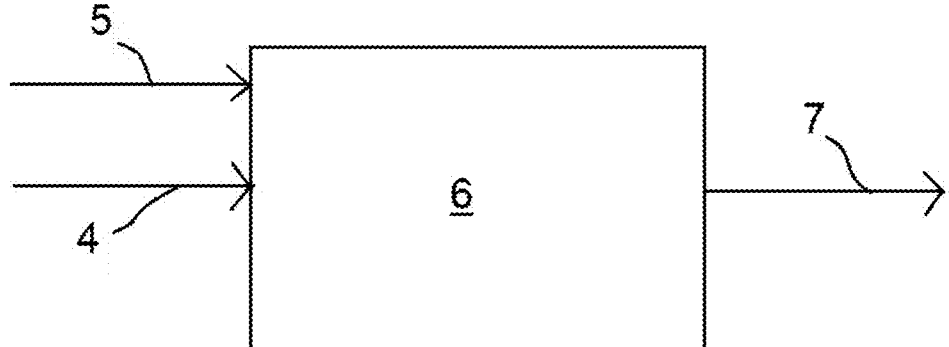
FIG. 2 shows a process flow diagram of making the set stabilizer particles by grinding.

Preferably, the calcium sulfate dihydrate seed crystals are coated with the dehydration-preventing substance, and therefore any mechanical or chemical means by which such coating can be accomplished is to be considered as within the scope and intent of the present inventive concept. For example, a solution of dehydration-preventing substance, e.g., corn sugar, in the proportion of 5 to 25 parts by weight thereof, may be sprayed into 100 parts by weight of calcium sulfate dihydrate in powdered form while the latter is being vigorously agitated in a mixer until the solvent (water) has evaporated, thus leaving the dehydration-preventing substance attached to or interspersed with the calcium sulfate dihydrate crystals. Alternatively, grinding in a ball mill or the like coats the gypsum particles with sugar or other dehydration-preventing substance. Thus, the dehydration-preventing substance may be intimately ground, as for example in a ball mill or the like, with the set-stabilizing calcium sulfate dihydrate crystal material as shown in FIG. 2. As shown in FIG. 2 a stream 4 of particles comprising calcium sulfate and hydrophobic material and a stream 5 of dehydration-preventing substance are fed to a ball mill 6 and ground together to coat the dehydration-preventing substance onto the particles comprising calcium sulfate and hydrophobic material to produce a stream 7 of particles comprising calcium sulfate and hydrophobic material coated with the dehydration-preventing substance.

When using materials other than corn sugar, it is preferable to use the equivalent quantities of the other substances. Among the sugars, other than corn sugar, it may be mentioned that any carbohydrate having a sweetish taste and of the general formula $C_nH_{2n}O_n$ or $C_nH_{2n-2}O_{n-1}$ may be employed. In general, hexose sugars of the general formula $C_6H_{12}O_6$ are more efficient. However, the invention is not to be confined to these particular sugars, since it has been found that other sugars, such as maltose, lactose, sucrose, and similar saccharine products, may be employed in lieu thereof. Thus, for example, molasses also exhibits a protective property, although it is not as efficient as the pure sugar. On the other hand, a thoroughly dextrinized starch, such for example as British gum, may be used; and, as already mentioned, glycerol or glycols may be employed in the manner above indicated.

The set stabilizer particles typically have a particle surface area of 5000 to 15000 cm²/gm, for example 7000-14000 cm²/gm or for example 9000-12000 cm²/gm. The set stabilizer particles typically have a particle size distribution with a Dv50 particle size of about 10 μm to about 60 μm, for example about 20 μm to about 50 μm. The Dv50 particle size would be the maximum particle diameter below which 50% of the sample volume exists—also known as the median particle size by volume. Particle sizes may be determined simply by passing the materials through sieves of appropriate sizes, as is well known in the art. Particle size distribution (e.g., D50) may be determined using means known in the art as well. For example, one non-limiting example is disclosed in ASTM D6913/D6913M-17 Method B, Standard Test Methods for Particle-Size Distribution (Gradation) of Soils Using Sieve Analysis.

Mixtures of Calcium Sulfate Hemihydrate Particles and Set Stabilizer Particles

The present invention relates to a cementitious powder comprising:

stucco particles comprising calcium sulfate hemihydrate, wherein at least 60 wt. %, preferably at least 70 wt. %, more preferably at least 80 wt. %, typically at least 90 wt. % or typically at least 95 wt. % of the cementitious powder is calcium sulfate hemihydrate; and 0.5-5 wt %, preferably 0.5 to 4 wt %, more preferably 0.5-2 wt % or 0.5-1.5 wt %, the set stabilizer particles of the invention.

Typically the set stabilizer particles may be included in the slurry used to make a gypsum board in an amount of 0.5-5 wt %, preferably 0.5 to 4 wt %, more preferably 0.5-2 wt % or 0.5-1.5 wt % of the slurry on a dry (water free) basis. A typical plaster embodying the concept of the present invention, may be combined the following relative amounts:

1000 parts by weight-calcium sulfate hemihydrate (typically provided by calcined gypsum stucco), 5-50, preferably 5 to 40, more preferably 2 to 20 or 5-15, e.g., 10, parts by weight set stabilizer particles, wherein the set stabilizer particles themselves are compounded in the proportions of 100 parts by weight of calcium sulfate dihydrate crystals in finely divided form and 5 to 25 parts by weight of a dehydration-preventing substance selected from the group consisting of sugars, dextrins, and polyhydroxy alcohols, such as glycerol or polyglycols, wherein the calcium sulfate dihydrate crystals comprise 50 to 98 wt. % calcium sulfate dihydrate and 0.05 to 10 wt. % hydrophobic material selected from wax and/or siloxane.

The gypsum products of the present disclosure may be produced from slurries according to Table 1. The resultant gypsum products may have a composition according to Table 2. In Tables 1 and 2 any range for a component may be substituted for any other range for that component in the respective Table. In Tables 1 and 2 "Set Stabilizer Particles" are set stabilizer particles of the invention containing hydrophobic material. Any other set stabilizer particles or accelerators are termed in this application as "Accelerator". For example, the Preferred Range for Set Stabilizer Particles may be used with the other components provided in their broad ranges.

TABLE 1

| Example Slurry Composition (parts by weight, dry basis) | | | |
| --- | --- | --- | --- |
| Component | Broad Range | Preferred Range | More Preferred Range |
| Calcium Sulfate Hemihydrate (stucco) | 100 | 100 | 100 |
| Catalyst | 0.01-5 | 0.1-5 | 0.3-3 |
| Siloxane | 0.01-2 | 0.05-1.5 | 0.1-1.2 |
| Set Stabilizer Particles | 0.5-5 | 0.5-4 | 0.5-2 |
| Accelerator | 0-5 | 0-3.5 | 0.5-2 |
| Starch | 0-2 | 0-2 | 0.5-1.5 |
| Set Retarder | 0-2 | 0-1 | 0-1 |
| Dispersant | 0.1-2 | 0.1-1 | 0.1-0.5 |

TABLE 1-continued

| Example Slurry Composition (parts by weight, dry basis) | | | |
|---|---|---|---|
| Component | Broad Range | Preferred Range | More Preferred Range |
| Filler | 0-5 | 0-4 | 0-3 |
| Other Additives (independently) | 0-2 | 0-2 | 0-2 |
| Water | 50-150 | 75-125 | 80-110 |

TABLE 2

| Example Set Product Composition (parts by weight) | | | |
|---|---|---|---|
| Component | Broad Range | Preferred Range | More Preferred Range |
| Calcium Sulfate Dihydrate (gypsum) | 100 | 100 | 100 |
| Catalyst | 0.01-5 | 0.1-5 | 0.3-3 |
| Siloxane | 0.01-2 | 0.05-1.5 | 0.1-1.2 |
| Set Stabilizer Particles | 0.5-5 | 0.5-4 | 0.5-2 |
| Accelerator | 0-5 | 0-3.5 | 0.5-2 |
| Starch | 0-2 | 0-2 | 0-1 |
| Set Retarder | 0-2 | 0-1 | 0.01-1 |
| Dispersant | 0.1-2 | 0.1-1 | 0.1-0.5 |
| Filler | 0-5 | 0-4 | 0-3 |
| Other Additives (independently) | 0-2 | 0-2 | 0-2 |

The present invention relates to a plaster comprising:
particles comprising calcium sulfate hemihydrate;
set stabilizer particles of the invention;
optionally a retarder, preferably the retarder comprises sodium citrate.

Methods for Manufacture of Gypsum Boards

The present invention also provides a method for using the set stabilizer particles of the invention to manufacture gypsum board comprising:

preparing an aqueous gypsum slurry comprising a mixture of water, stucco and the set stabilizer particles, wherein the stucco comprises calcium sulfate hemihydrate, wherein the aqueous gypsum slurry comprises a mixture of:

at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, 0.5-5 wt %, preferably 0.5 to 4 wt %, more preferably 0.5-2 wt % or 0.5-1.5 wt %, the set stabilizer particles, 0 to 5 wt. % on a dry (water free) basis, preferably an absence of, hydrophobic material selected from wax and/or siloxane other than hydrophobic material provided by the set stabilizer particles, typically an absence of siloxane other than siloxane provided by the set stabilizer particles and an absence of wax, other than wax provided by the set stabilizer particles, and the water at a weight ratio of water to the calcium sulfate hemihydrate of 0.2:1 to 1.2:1; and depositing a front cover sheet, over a forming surface;

depositing the aqueous gypsum slurry over the front cover sheet to form a layer of the aqueous gypsum slurry, preferably the aqueous gypsum slurry being deposited for the core layer is foamed aqueous gypsum slurry;

depositing a back cover sheet over the aqueous gypsum slurry; and setting the calcium sulfate hemihydrate to form a panel comprising a gypsum core comprising calcium sulfate dihydrate; and drying the panel and cutting the panel into a gypsum board having one or more pre-determined dimensions.

In the present specification, all weight percent values unless otherwise indicated are in weight percent. As used herein, "total dry weight" or "on a dry weight basis" refers to the weight of a mixture excluding any water component that may be present. "Water component" excludes the water that may be present in a gypsum crystal structure. In contrast, a "wet basis" includes water in the wt. % calculation.

The stucco particles comprising calcium sulfate hemihydrate and the set stabilizer particles may be fed to a slurry mixer as separate streams to mix with water to form the aqueous gypsum slurry. The set stabilizer particles comprise a particle core comprising 50 to 98 wt. % calcium sulfate dihydrate and 0.05 to 10 wt. % hydrophobic material selected from wax and/or siloxane, and a coating comprising a dehydration-preventing substance selected from the group consisting of sugars, dextrins, and polyhydroxy alcohols at a ratio of about 5 to 25 parts by weight of dehydration-preventing substance per 100 parts by weight of calcium sulfate dihydrate. In the alternative, the stucco particles and the set stabilizer particles may be combined to form a combined stream of cementitious powder that is fed to a slurry mixer to mix with water to form the aqueous gypsum slurry. In either case, the aqueous gypsum slurry may be formed into new gypsum materials suitable for use as building materials. For example, new gypsum panels of varying widths and thicknesses may be manufactured by methods known in the art. Water, and optionally one or more additives, are fed to make the aqueous gypsum slurry either separately or with one or more of the stucco particles and the set stabilizer particles. The set stabilizer particles are mixed with stucco to form a powder and the powder is fed to the mixer Embodiments of the invention may comprise adding a foaming agent to the aqueous gypsum slurry to make a core layer of the gypsum board. The foaming agent ma or may not include alpha-sulfo fatty acid di salts.

Figure 3:
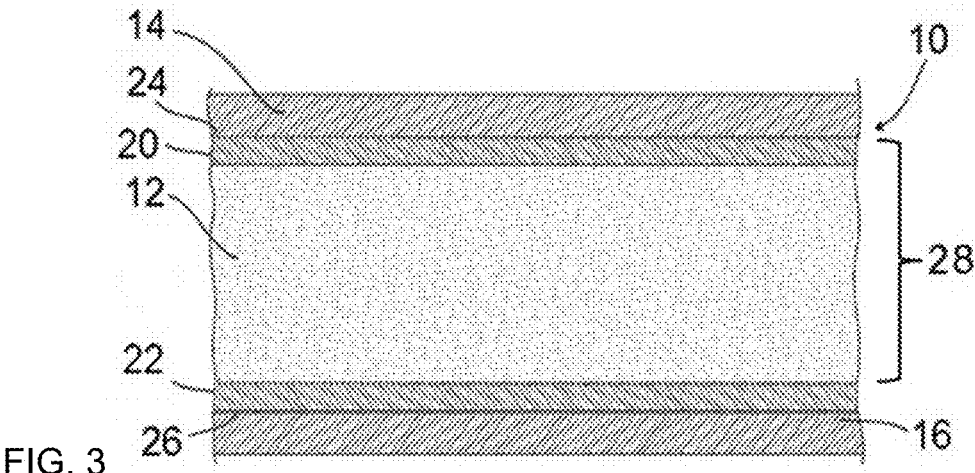
FIG. 3 shows a cross-sectional view of a gypsum board of the invention, in which a board core (gypsum core) is between a front cover sheet and a back cover sheet.
Figure 4:
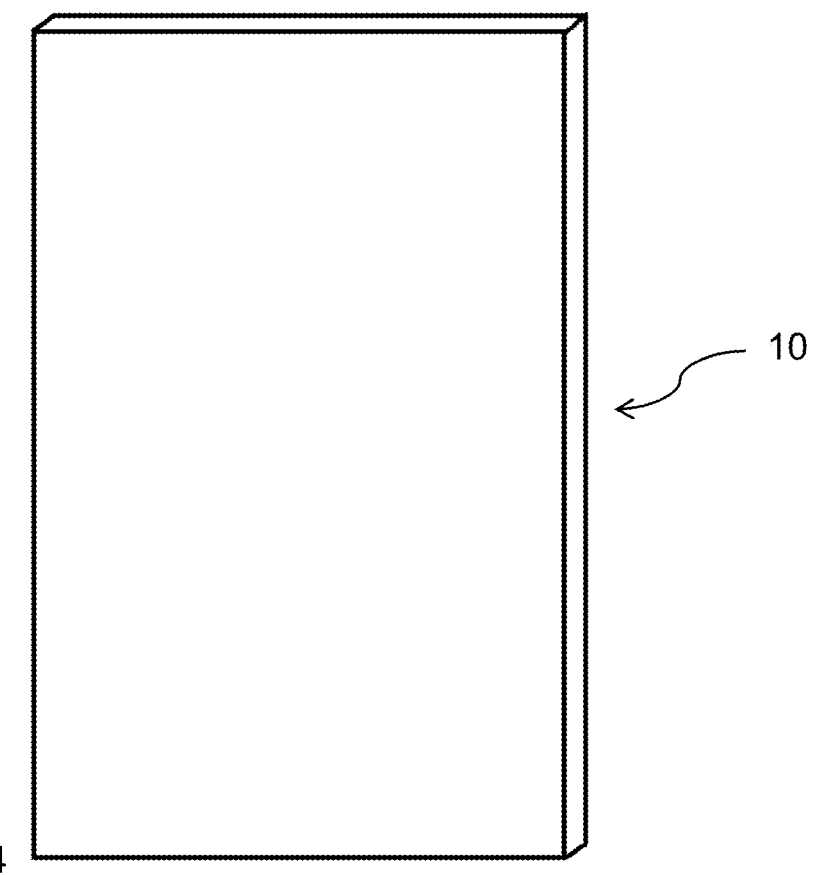
FIG. 4 shows a perspective view of the gypsum board of FIG. 3.

FIG. 3 depicts an example of a wallboard panel 10 of the invention. FIG. 4 shows a perspective top (axial) view of the wallboard panel 10. The board has a core 28 that comprises a set low-density region (less dense region) 12 as a layer comprising calcium sulfate dihydrate and a set high-density region (also known as a densified region or a thin dense gypsum layer) 22 as a layer comprising calcium sulfate dihydrate.

FIG. 3 depicts the wallboard panel 10 of the invention in which the core 28 that comprises a gypsum low-density region 12 (for example 0.5 inch thick) is between a back cover sheet 14 (also known as a backer cover sheet) and a front cover sheet 16 (also known as a facer cover sheet), which may each be single-ply or multi-ply paper or fibrous material such as glass fiber mat. The inner surface of the back cover sheet 14 creates a bond side 24 of the back cover sheet 14 which faces the gypsum core 28. The inner surface of the front cover sheet 16 creates a bond side 26 of the front cover sheet 16 which faces the gypsum low-density region 12. The high-density region (thin dense gypsum layer) 22 lies between the gypsum low-density region (less dense region) 12 and the front cover sheet 16 to contact the gypsum low-density region 12 and the front cover sheet 16. Optionally a second set high-density region (also known as a densified region or a thin dense gypsum layer) 20 as a layer comprising calcium sulfate dihydrate lies on the back sheet 14 bond side. The outer surface of the back cover sheet 14 faces wall framing (not shown) of a room after the wallboard panel 10 is installed as an interior wall. The outer surface of the front cover sheet 16 faces inside of a room after the wallboard panel 10 is installed as an interior wall.

Generally the relatively low-density region 12 and relatively high-density region 20,22 have the same composition and are contiguous with one another. However, the low-density region may be formed from a gypsum slurry in a foamed state, whereas the high-density region may be from a gypsum slurry that is not foamed so that a denser layer forms. That is, the high-density region may have a lower porosity associated therewith than does the low-density region.

The combined density of the gypsum low-density region 12 and the high-density regions 20, 22 may be about 15 pounds/cubic foot to about 65 pounds/cubic foot, more typically 25 pounds/cubic foot to about 65 pounds/cubic foot, for example 25 pounds/cubic foot to 55 pounds/cubic foot.

The low-density region (e.g., low-density region 12 of FIG. 3) resulting from the set gypsum low-density region slurry generally has a thickness of 0.25 inches to 1.5 inches and a density of 15 to 55 pounds/cubic foot. In contrast, generally the high-density region (e.g., high-density regions 20, 22 of FIG. 3) each has a thickness of 5% to 25% of the thickness of the gypsum board 10. Typically the densified layer has a thickness of from about 0.02 inches to about 0.2 inches (about 0.05 to about 0.5 cm), for example, from about 0.0625 inch to about 0.125 inch (about 0.16 to about 0.32 cm). The thickness of the low-density region layer 12 is greater than the thickness of each of the high-density region layers 20, 22. When foamed, the gypsum low-density region layer resulting from the set foamed gypsum slurry has a total void volume of 10 to 92 volume percent, particularly 25 to 90 volume percent, and more particularly 30 to 85 volume percent. In contrast, the densified layer has a total void volume of less than 30 volume percent, for example less than 25 volume percent, and is less than 0.25 inches thick.

Various methods can be employed for preparing a gypsum board of the present invention from an aqueous gypsum slurry comprising calcium sulfate hemihydrate and the set stabilizer particles of the present invention.

The base material from which gypsum wallboard and other gypsum products are manufactured is the hemihydrate form of calcium sulfate ($CaSO_4 \cdot \frac{1}{2}H_2O$), commonly termed "calcined gypsum" or "stucco," which is produced by heat conversion (calcination) of the dihydrate form of calcium sulfate ($CaSO_4$).

Illustrative manufacturing techniques and equipment suitable for forming gypsum board according to the present invention can be found, for example, in U.S. Pat. No. 7,364,676 and U.S. Patent Application Publication 2010/0247937, each of which is incorporated herein by reference in its entirety. To produce gypsum board, the stucco is mixed with water, set stabilizer of the present invention and, if desired, other additives to form an aqueous gypsum slurry which is continuously fed between continuous layers of paper on a board machine. One cover sheet is called the face cover sheet, or front cover sheet or facer. The other cover sheet is called the back cover sheet, or backer.

Typically, to produce gypsum board having front and back cover sheets, the stucco is mixed with water and additives to form an aqueous slurry which is continuously fed between continuous layers of sheets, e.g., paper sheets, on a board machine. As the board moves down a conveyer line to form a panel, the set stabilizer of the present invention assists in causing the calcium sulfate hemihydrate to recrystallize or rehydrate, to revert to calcium sulfate dihydrate in its original rock state. The cover sheet becomes bonded to the core as the gypsum sets. The panel is then cut to length and conveyed through dryers to remove any free moisture.

Such processes discharge the first cover sheet onto a moving conveyor. Dry and/or wet components of the aqueous gypsum slurry are fed to a mixer (e.g., a pin or pinless mixer), where they are agitated to form the aqueous gypsum slurry. The aqueous gypsum slurry can be made with any suitable water/calcium sulfate hemihydrate ratio for disposition onto the first cover sheet. Since gypsum board is normally formed "face down," this first cover sheet typically corresponds to the facer (front cover sheet) upon completion of the fabrication process. The mixer comprises a main body and a discharge conduit (e.g., a gate-canister-boot arrangement as known in the art, or an alternative arrangement, such as that described in U.S. Pat. Nos. 6,494,609 and 6,874,930, which are incorporated herein by reference in their entirety). In some process configurations, the discharge conduit may include a slurry distributor with either a single feed inlet or multiple feed inlets, such as those described in U.S. Patent Application Publication 2012/0168527 and 2012/0170403, which are incorporated herein by reference in their entirety. When using a slurry distributor with multiple feed inlets, the discharge conduit can include a suitable flow splitter, such as those described in U.S. Patent Application Publication 2012/0170403. Foaming agent (typically soap) can be added in the discharge conduit of the mixer (e.g., in the gate as described, for example, in U.S. Pat. Nos. 5,683,635 and 6,494,609, which are incorporated herein by reference) or in the main body, if desired. Slurry discharged from the discharge conduit after all ingredients have been added, including foaming agent, is the primary gypsum slurry and is used to form the low-density region layer. This gypsum slurry is discharged onto the moving first cover sheet.

After mixing, the aqueous gypsum slurry optionally has foam added to decrease the product density. Foam is generated by combining soap and water. The foam may then be injected into the aqueous gypsum slurry after it exits from the mixer through a hose or chute. Foam is typically added to the portion of aqueous gypsum slurry for the less dense layer of the core, but not for the portion of slurry for the densified layer.

When the foam and the aqueous gypsum slurry have been brought together, the resulting slurry moves toward, and is poured onto, a conveyor lined with a first piece of facing material which is the first cover sheet. Another piece of facing material which is the second cover sheet is placed on top of the slurry, forming a sandwich assembly with the slurry between the two facing materials. The sandwich assembly is fed to a forming plate or other forming device, the height of which determines the thickness of the board. Next the continuous sandwich assembly is cut into appropriate lengths at a cutting knife, usually eight feet to twelve feet. As the board moves down a conveyer line to form a panel the slurry is allowed to harden (set). The calcium sulfate recrystallizes or rehydrates, reverting to its original rock state to form a board core comprising an interlocking crystalline matrix of set gypsum. The cover sheets become bonded to the core as the gypsum sets. The panel is then cut to length and conveyed through kilns or dryers to remove any free moisture. Temperatures in the kiln typically range from 450° F. to 500° F. maximum.

As described above, the front cover sheet is in interfacial contact with a high-density region, also known as a densified layer. The densified layer is typically contiguous with the low-density region layer after setting. Where foam is inserted into the discharge conduit, a stream of secondary gypsum slurry can be removed from the mixer body before foaming to provide a slurry for forming the densified layer. The densified layer may be deposited onto the moving first cover sheet before the main portion of the gypsum slurry is deposited for forming the low-density region layer. After being discharged from the discharge conduit, the gypsum slurry for the low-density region is spread, as necessary, over the first cover sheet and the densified layer. At this point, the second cover sheet is placed over the spread gypsum low density region slurry. If the optional second high density region is absent the spread gypsum low-density region slurry is contacted with the second cover sheet, upon which the first densified layer has already been deposited. The resulting wet assembly is in the form of a multi-layer assembly, which is a precursor to the final gypsum board product. The densified layer can be formed from the same or different gypsum slurry as the low-density region layer.

Figure 5:
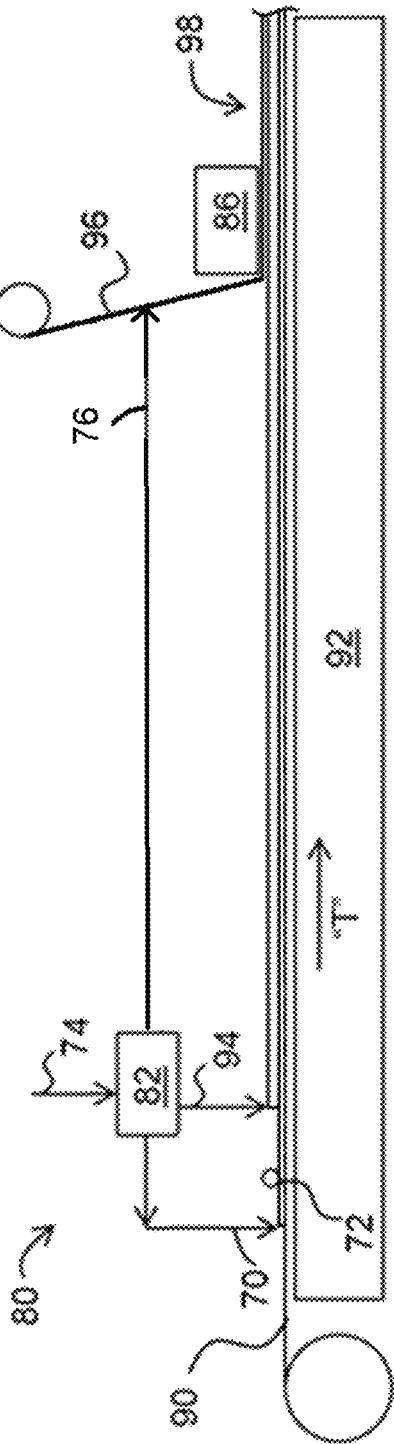
FIG. 5 shows a process flow diagram of a version of a manufacturing production line for producing a layered gypsum board of the present invention.

FIG. 5 illustrates an example of a wet end 80 (upstream portion) of a manufacturing production line for producing a layered gypsum board of the present invention having a gypsum layer between two cover sheets, and provided with the densified layer. The cover sheets are, for example, made of paper, for example manila paper or Kraft paper.

The wet end 80 includes a gypsum slurry mixing and dispensing assembly 82 and a forming station 86. FIG. 5 shows the stucco particles and the set stabilizer particles of the present invention may be fed together to the gypsum slurry mixing and dispensing assembly 82 as a stream 74. However, in the alternative, the stucco particles and the set stabilizer particles of the present invention may be fed separately to the gypsum slurry mixing and dispensing assembly 82.

A first moving web 90 of first cover sheet material (face sheet) moves in a longitudinal direction of travel "T" along the forming table 92. The gypsum low-density region slurry 94 is mixed in the gypsum slurry mixing and dispensing assembly 82 where additives are added and foaming of the slurry for the low-density region layer (e.g. layer 12, FIG. 3) occurs. While the gypsum slurry mixing and dispensing assembly 82 is illustrated as a single component of the wet end 80, there can be multiple components that comprise the gypsum slurry mixing and dispensing assembly 82.

A densified layer slurry 70 from the gypsum slurry mixing and dispensing assembly 82 is applied to the first cover sheet material 90 to form a densified layer (e.g. high-density region 22, FIG. 3) on the first cover sheet material 90, and passes under a first gypsum densified layer roller 72, before depositing the gypsum central low-density region layer slurry 94. A densified layer slurry 76 is applied to the second cover sheet material (back sheet material) 96 to form the second high-density region layer (e.g. layer 20, FIG. 3). The second cover sheet material (back sheet material) 96 is then applied over the deposited low-density region layer slurry 94 to form a multilayer structure. Then the multilayer structure is passed through the forming station 86 to compress the layers into a desired total thickness. The resultant structure is a gypsum board preform 98.

The cover sheet materials may be uncoated or coated with, for example, a pre-applied outer surface polymer coating and a hydrophobic finish. Typically the outer surface of the applied moving webs 90 and 96 as well as the resulting outer surface of the front and back cover sheets of the gypsum board are uncoated and in contact with no additional layers.

Additional components can be included in the wet end 80 of the manufacturing line.

The gypsum densified layer will be thinner and denser than the low-density region layer. Thus, the gypsum densified layer slurry is relatively denser than the gypsum low-density region layer slurry which may be a foamed gypsum slurry. Typically the calcined gypsum (calcium sulfate hemihydrate) slurry 94 for the low-density region layer is foamed to be less dense than the slurry 70 and the slurry 76 of the densified layers. Thus if desired, calcined gypsum low-density region layer slurry stream 94 may pass through a foamer device (not shown), which for instance mixes the calcined gypsum low-density region layer slurry stream 94 with foam and/or air, prior to deposition on the first cover sheet material 90. As is known in the art, the densified layer can be achieved by directing a portion of the gypsum slurry out of the mixer and into a densified layer mixer prior to introduction of foam into the gypsum slurry or by beating foam out of the gypsum densified layer slurry. Thus, the gypsum low-density region layer slurry 94 for the low-density region layer of the board is deposited onto the gypsum densified layer slurry 70. Typically the gypsum low-density region layer slurry stream 94 and the slurry streams 70, 76 for the gypsum densified layers have the same composition and density. However if desired, the gypsum low-density region layer slurry stream 94 and the slurry streams for the gypsum densified layers 70, 76 can have different compositions and/or densities. FIG. 5 shows all the gypsum slurries 70, 76, 94 coming from the same calcined gypsum slurry mixing and dispensing assembly 82. However, the calcined gypsum slurries 70, 76, 94 can come from different mixing and dispensing assemblies to have different properties, such as different densities.

The gypsum densified layer roller 72, the forming table 92, the forming station 86 can all comprise conventional equipment suitable for their intended purposes as is known in the art. The wet end 80 can be equipped with other conventional equipment as is known in the art.

The calcined gypsum in the gypsum slurries 70, 76, 94 reacts with the water and sets as a conveyor moves the gypsum board preform 98 down a manufacturing line. The gypsum board preform 98 is dried and cut into segments of predetermined dimensions at a point along the line where the gypsum board preform 98 has set sufficiently. The segments can be dried (e.g., in a kiln) to drive off excess water, and processed to provide the final layered wallboard of desired dimensions.

The forming station 86 is the location in the board line where wet board precursor is sized to a pre-determined width and thickness, and optionally, length. Thus, the forming station includes, or can be, any device capable of performing a final mechanical spreading and/or shaping of the slurry across the width of the backing layer, many of which are known in the art. The forming station comprises a means of conforming the slurry thickness and width to the final desired thickness and width of a wet board precursor that, when set, will produce the cementitious board product. The final desired slurry thickness and width produced at the forming station can, of course, differ from the final thickness and width of the finished board product. For example, the slurry thickness and/or width can expand and/or contract during crystallization (i.e., setting) and drying of the slurry. Typically, the desired slurry thickness is substantially equal to the desired board thickness (e.g., about 0.375" (about 0.95 cm), about 0.5" (about 1.27 cm), about 0.625" (about 1.59 cm), about 0.75" (about 1.90 cm), or about 1" (about 2.54 cm). By way of illustration only, the final board thickness typically is within about + or −⅛" (about 0.32 cm) or less of the final slurry thickness.

The forming station includes any device that is capable of creating the desired slurry thickness and width of the wet board precursor. Suitable devices include, for example, a forming plate, a forming roller, a forming press, a screed, and the like. The particular device used will depend, in part, on the type of cementitious board being produced. In a preferred embodiment, for example when the board forming system is a gypsum board or acoustical panel forming system, the board forming station comprises a forming plate as is known in the art. The board forming system of any of the above embodiments optionally further comprises a blade for cutting wet board precursor or dry cementitious board product to the desired lengths, and/or a drying region capable of removing water from the set cementitious board.

Gypsum and Stucco (Calcined Gypsum)

The calcium sulfate hemihydrate component used to form the crystalline matrix of the gypsum panel core typically comprises beta calcium sulfate hemihydrate, water-soluble calcium sulfate anhydrite, alpha calcium sulfate hemihydrate, or mixtures of any or all of these, and obtained from natural or synthetic sources. The calcium sulfate hemihydrate is typically provided in the raw material known as stucco or calcined gypsum. In some aspects, the stucco may include non-gypsum minerals, such as minor amounts of clays or other components that are associated with the gypsum source or are added during the calcination, processing and/or delivery of the stucco to the mixer. The stucco can be fibrous or non-fibrous. Typically the raw stucco has at least 70 wt. % calcium sulfate hemihydrate, preferably at least 80 wt. % calcium sulfate hemihydrate, more preferably at least 85 wt. % calcium sulfate hemihydrate, and furthermore preferably at least 90 wt. % calcium sulfate hemihydrate.

Additives

In addition to the set stabilizer particles of the present invention, other additives that may be present in the gypsum slurry used to form the board core. Such additives may include, but are not limited to, strengthening agents, foam (prepared from a suitable foaming agent), dispersants, polyphosphates (e.g., sodium trimetaphosphate), starches, retarders, accelerators, recalcination inhibitors, binders, adhesives, secondary dispersing aids, leveling or non-leveling agents, thickeners, bactericides, fungicides, pH adjusters, buffers, colorants, reinforcing materials, fire retardants, water repellants (for example siloxane), fillers, and mixtures thereof.

Additives and other components of the gypsum slurry may be added to the mixer in various ways. For example, various combinations of components may be pre-mixed before entering the mixer, either as one or more dry components and/or as one or more wet components. Singular components may similarly be introduced to the mixer in wet or dry form. If introduced in a wet form, the components may be included in a carrier fluid, such as water, in any suitable concentration.

Fibers can optionally be used in the methods and composition of the present invention. The fibers may include mineral fibers (also known as mineral wool), glass fibers, carbon fibers, and mixtures of such fibers, as well as other comparable fibers providing comparable benefits to the wallboard. For example, glass fibers can be incorporated in the gypsum low-density region slurry and/or the high-density region layer slurry and resulting crystalline core structure. The glass fibers in such aspects may have an average length of about 0.5 to about 0.75 inches and a diameter of about 11 to about 17 microns. In other aspects, such glass fibers may have an average length of about 0.5 to about 0.675 inches and a diameter of about 13 to about 16 microns. In yet other aspects, E-glass fibers are utilized having a softening point above about 800° C. or above at least about 900° C. Mineral wool or carbon fibers such as those known to those of ordinary skill may be used in place of or in combination with glass fibers.

Fibers, when included, can be present in the gypsum low density layer slurry and/or the gypsum high density layer slurry in amounts on a dry basis per 100 pbw of calcium sulfate hemihydrate of about 0.5 to about 10 pbw; preferably about 1 to about 8 pbw; more preferably about 2 to about 7 pbw; and most preferably about 3 to about 6 pbw. There may also be an absence of fibers.

Optionally, one or more phosphate-containing compounds can also be included in the slurry, if desired. For example, these phosphate-containing components can include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salts. Illustrative examples are described in U.S. Pat. Nos. 6,342,284; 6,632,550; 6,815, 049; and 6,822,033, which are incorporated herein by reference in their entirety.

Phosphate-containing components can enhance green strength, resistance to permanent deformation (e.g., sag), dimensional stability, and the like. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is commonly used, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphates usually are added in a dry form and/or an aqueous solution liquid form, with the dry ingredients added to the slurry mixer, with the liquid ingredients added to the mixer, or in other stages or procedures.

When present, the phosphate can be included in the gypsum slurry in a dry form or in a form in water (e.g., a phosphate solution from about 5% to about 20%, such as about a 10% solution). If included, the phosphate can be present in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco. There may also be an absence of phosphate.

The gypsum slurry can optionally include at least one dispersant to enhance fluidity. The dispersant(s) may be introduced to the gypsum slurry in a dry form, optionally with other additives, and/or in a liquid form, optionally with other liquid components. Examples of suitable dispersants include naphthalene sulfonates, such as polynaphthalene sulfonic acid and its salts (polynaphthalenesulfonates) and derivatives, which are condensation products of naphthalenesulfonic acids and formaldehyde, as well as polycarboxylate dispersants, such as polycarboxylic ethers, for example. Other examples of suitable dispersants include lignosulfonates or sulfonated lignin. Lignosulfonates are water-soluble anionic polyelectrolyte polymers, which are byproducts from the production of wood pulp using sulfite pulping.

Lower molecular weight dispersants may be desirable. Lower molecular weight naphthalene sulfonate dispersants may be favored because they trend to a lower water demand than higher viscosity, higher molecular weight dispersants. Thus, molecular weights from about 3,000 to about 10,000 (e.g., about 8,000 to about 10,000) may be desirable molecular weights for a dispersant. If desired, the molecular weight of the polycarboxylate dispersants can be from about 20,000 to about 60,000, which may exhibit less retardation than dispersants having molecular weights above about 60,000.

Typical naphthalenesulfonates are a naphthalene sulfonate solution in water, having a range of about 35% to about 55% by weight naphthalenesulfonate solids content. However, if desired the naphthalenesulfonates can be used in dry solid or powder form.

When present, the dispersant can be included in the gypsum slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, or the like. There may also be an absence of any one or more of polynaphthalenesulfonates, polycarboxylic ethers or lignosulfonates.

In addition to the set stabilizing particles of the present invention, additional accelerators may be added to the gypsum low density layer slurry and/or the high density layer slurry.

Accelerators may be added to the gypsum low density layer slurry and/or the high density layer slurry to modify the rate at which the calcium sulfate hemihydrate hydration reactions take place. When present, the accelerator can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%). Suitable accelerators may include, for example, potassium sulfate, calcium sulfate dihydrate, carbohydrate-coated calcium sulfate, calcium sulfate dihydrate/organic phosphonate, and calcium sulfate dihydrate/organic phosphate.

Another accelerator could be set stabilizing particles having an absence of hydrophobic material, such as an absence of siloxane and an absence of wax. A typical such set accelerator is set stabilizer particles of calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference.

Another accelerator comprises 95% calcium sulfate dihydrate co-ground with 5% sugar and heated to 250° F. (121° C.) to caramelize the sugar. This is made according to U.S. Pat. No. 3,573,947, herein incorporated by reference.

A description of the use of and a method for making another accelerator are disclosed in U.S. Pat. No. 6,409,825, herein incorporated by reference. The wet gypsum accelerator is used in amounts ranging from about 5 to about 80 pounds per thousand square feet (24.3 to 390 g/m²) of board product.

Retarders may be added to the gypsum low density layer slurry and/or the high density layer slurry to modify the rate at which the calcium sulfate hemihydrate hydration reactions take place. When present, the retarder can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%).

There may also be an absence of accelerators and/or retarders other than the set stabilizing particles of the present invention.

Foam (also known as foam water) may optionally be introduced into the gypsum low-density region slurry and/or the high-density region slurry (preferably the gypsum low-density region slurry) in amounts that provide the above mentioned reduced low-density region density and panel weight. The foaming agent to produce the foam is typically a soap or other suitable surfactant. The introduction of foam in the gypsum low-density region slurry in the proper amounts, formulations, and process will produce a desired network and distribution of voids within the low-density region of the final dried wallboards. This void structure permits the reduction of the gypsum and other low-density region constituents and the low-density region density and weight, while maintaining desired panel structural and strength properties. If present, foaming agents may comprise a major weight portion of unstable component and a minor weight portion of stable component (e.g., where unstable and blend of stable/unstable are combined). The weight ratio of unstable component to stable component is effective to form an air void distribution within the set gypsum low-density region, as described in U.S. Pat. Nos. 5,643,510; 6,342,284; and 6,632,550, which are incorporated herein by reference in their entirety. The approaches for adding foam to a gypsum low-density region slurry are known in the art and one example of such an approach is discussed in U.S. Pat. No. 5,683,635, the disclosure of which is incorporated by reference herein. Evaporative water voids, generally having voids of about 5 μm or less in diameter, also contribute to the total void distribution along with the aforementioned air (foam) voids. The volume ratio of voids with a pore size greater than about 5 microns to the voids with a pore size of about 5 microns or less, is from about 0.5:1 to about 9:1, such as, for example, about 0.7:1 to about 9:1, about 1.8:1 to about 2.3:1, or the like. The foaming agent is present in the gypsum slurry in an amount, for example, of less than about 0.5% by weight of the stucco, such as about 0.01% to about 0.5%, about 0.01% to about 0.2%, about 0.02% to about 0.4%, about 0.02% to about 0.2%, about 0.01% to about 0.1%, or the like. There may also be an absence of foaming agents.

Components for fire and/or water resistance can also be included in the gypsum slurry. Examples include, for instance, siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). Further disclosure on such additives may be found in U.S. Pat. No. 8,323,785, which is incorporated by reference in its entirety. High expansion vermiculite may be included, although other fire resistant materials can be included. If present, fire or water resistance additives can be included in any suitable amount as desired depending, e.g., on fire rating, and like performance parameters. For example, if included, the fire or water resistance additives can be individually present in an amount from about 0.5% to about 10% by weight of the stucco, such as from about 1% to about 10%, about 1% to about 8%, about 2% to about 10%, about 2% to about 8%, or the like.

If included, the siloxane may desirably be introduced in the form of an emulsion. The slurry may then be shaped and dried under conditions which promote the polymerization of the siloxane to form a highly crosslinked silicone resin. A catalyst which promotes the polymerization of the siloxane to form a highly crosslinked silicone resin can be added to the gypsum slurry. Solventless methyl hydrogen siloxane fluid can be used as the siloxane. This product is a siloxane fluid containing no water or solvents. It is contemplated that about 0.3% to about 1.0% of the siloxane may be used if desired, based on the weight of the dry ingredients. For example, if desired, about 0.4% to about 0.8% siloxane may be present in the gypsum slurry based on the dry stucco weight.

Water

Water is added to the slurry in any amount that makes a flowable slurry. The amount of water to be used varies greatly according to the application with which it is being used, the exact dispersant being used, the properties of the calcium sulfate hemihydrate, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The water can be present in the gypsum low-density region slurry and/or the high-density region layer slurry of the present invention at a weight ratio of water to calcium sulfate hemihydrate of about 0.2:1 to about 1.2:1; preferably, about 0.3:1 to about 1.1:1; more preferably, about 0.6:1 to about 1:1; most preferably 0.7:1 to 0.95:1; and typically about 0.85:1.

Back Cover Sheet and the Front Cover Sheet

The front and back cover sheets may be made of paper or other fibrous material, such as a mat of glass fibers. The back paper cover sheet and the front cover sheet may be made from any suitable paper material having any suitable basis weight.

The back and front cover sheets may be made of paper. However, the paper materials for each cover sheet may be the same or different.

Various paper grades can be used in gypsum panels, including Manila grade paper with a smooth calendared finish is often used as the facer paper cover sheet, and Newsline paper with a rougher finish is often used as the backer paper cover sheet. Typically both paper grades are multi-ply with at least one liner ply and several filler plies. However, if desired at least one paper cover sheet or both paper cover sheets are made of single-ply paper.

Typically a back cover sheet only covers the back surface. In contrast, a front cover sheet covers the front surface of the board and also wraps around the board edges to contact the back cover sheet.

If desired, to enhance strength (e.g., nail pull strength), especially for lower density gypsum boards, one or both of the cover sheets can be formed from paper having a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, or the like). If desired, the front paper cover sheet may have a higher basis weight than does the back cover sheet, which may provide enhanced nail pull resistance and handling. The back paper cover sheet can have a somewhat lower basis weight if desired (e.g., a basis weight of less than 45 lbs/MSF, e.g., from about 33 lbs/MSF to 45 lbs/MSF (e.g., about 33 lbs/MSF to about 40 lbs/MSF).

Clauses of the Invention

The following clauses disclose various aspects of the invention.

Clause 1. A plurality of set stabilizer particles comprising
a particle core comprising 50 to 98 wt. %, preferably 70 to 98 wt. % or 70 to 95 wt. %, calcium sulfate dihydrate and 0.05 to 10 wt. %, preferably 0.5 to 5 wt. %, hydrophobic material selected from wax and/or siloxane, and
a coating on the particle core, the coating comprising a dehydration-preventing substance selected from the group consisting of sugars, dextrins, and polyhydroxy alcohols, such as glycerol or polyglycols, at a ratio of about 5 to 25 parts by weight of dehydration-preventing substance per 100 parts by weight of calcium sulfate dihydrate.

Clause 2. The set stabilizer particles of clause 1, wherein the dehydration-preventing substance comprises a hexose sugar.

Clause 3. The set stabilizer particles of clause 1, wherein the dehydration-preventing substance comprises a corn sugar.

Clause 4. The set stabilizer particles of clause 1, wherein the dehydration-preventing substance comprises a glycerol.

Clause 5. The set stabilizer particles of clause 1, wherein the dehydration-preventing substance comprises a substance selected from the group consisting of sugars, dextrins and polyhydroxy alcohols.

Clause 6. The set stabilizer particles of clause 1, comprising sugar-coated calcium sulfate dihydrate particles.

Clause 7. The set stabilizer particles of clause 1, wherein the hydrophobic material comprises siloxane.

Clause 8. The set stabilizer particles of clause 1, wherein the hydrophobic material comprises siloxane and wherein the set stabilizer particles comprise about 0.05 wt. % to about 5 wt. %, typically 0.1 wt. % to about 3 wt. %, said siloxane.

Clause 9. The set stabilizer particles of clause 1, wherein the hydrophobic material comprises wax.

Clause 10. The set stabilizer particles of clause 1, wherein the hydrophobic material comprises wax and wherein the set stabilizer particles comprise about 0.5 wt. % to about 10 wt. %, typically 1 wt. % to about 7 wt. %, for example, about 3 wt. % to about 7 wt. % of said wax.

Clause 11. A method for making the set stabilizer particles of any of clauses 1 to 10, comprising:
applying to feed particles of waste gypsum board material, comprising 50 to 98 wt. % calcium sulfate dihydrate and 0.05 to 10 wt. % hydrophobic material selected from wax and/or siloxane, a dehydration-preventing substance selected from the group consisting of sugars, dextrins, and polyhydroxy alcohols, such as glycerol or polyglycols, at a ratio of about 5 to 25 parts by weight of dehydration-preventing substance per 100 parts by weight of calcium sulfate dihydrate to produce set stabilizer particles, wherein the applying is typically coating by any suitable mechanical or chemical means, for example by grinding or spray coating the feed particles of waste gypsum board material with the dehydration-preventing substance.

Clause 12. A cementitious powder comprising:

stucco particles comprising calcium sulfate hemihydrate, wherein at least 60 wt. %, preferably at least 70 wt. %, more preferably at least 80 wt. %, typically at least 90 wt. % or typically at least 95 wt. % of the cementitious powder is calcium sulfate hemihydrate; and 0.5-5 wt %, preferably 0.5 to 4 wt %, more preferably 0.5-2 wt % or 0.5-1.5 wt %, the set stabilizer particles of any of clauses 1 to 10.

Clause 13. The cementitious powder of clause 12, further comprising a retarder.

Clause 14. The cementitious powder of clause 13, wherein the retarder comprises keratinaceous material which has been treated with caustic soda and quicklime which is a nitrogenous product which, because of its colloidal properties, has a retarding effect upon the setting time of the calcined gypsum, powdered glue, citrates, acetates, timothy hay extract, or proteinaceous retarder, preferably sodium citrate or proteinaceous retarder.

Clause 15. The cementitious powder of clause 12, being a set-stabilized calcium sulfate hemihydrate plaster comprising: the stucco particles comprising the calcium sulfate hemihydrate, a retarder, the set stabilizer particles, wherein the particle core of the set stabilizer particles comprising the calcium sulfate dihydrate are seed crystals, and wherein the dehydration-preventing substance comprises polyhydroxy alcoholic material that is water-soluble and relatively non-volatile, that coats said dihydrate and protects said dihydrate against loss of its water of crystallization.

Clause 16. A plaster comprising:

particles comprising calcium sulfate hemihydrate;

set stabilizer particles of any of clauses 1 to 10;

optionally a retarder, preferably the retarder comprises sodium citrate.

Clause 17. A method for using the set stabilizer particles of any of clauses 1 to 10 to manufacture a gypsum board comprising:

preparing an aqueous gypsum slurry comprising a mixture of water, stucco and the set stabilizer particles, wherein the stucco comprises calcium sulfate hemihydrate, wherein the aqueous gypsum slurry comprises a mixture of:

at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, 0.5-5 wt %, preferably 0.5 to 4 wt %, more preferably 0.5-2 wt % or 0.5-1.5 wt %, the set stabilizer particles, 0 to 5 wt. % on a dry (water free) basis, preferably an absence of, hydrophobic material selected from wax and/or siloxane other than hydrophobic material provided by the set stabilizer particles, typically an absence of siloxane other than siloxane provided by the set stabilizer particles and an absence of wax, other than wax provided by the set stabilizer particles, and the water at a weight ratio of water to the calcium sulfate hemihydrate of 0.2:1 to 1.2:1; and depositing a front cover sheet, over a forming surface;

depositing the aqueous gypsum slurry over the front cover sheet to form a layer of the aqueous gypsum slurry, preferably the aqueous gypsum slurry being deposited for the core layer is foamed aqueous gypsum slurry;

depositing a back cover sheet over the aqueous gypsum slurry;

setting the calcium sulfate hemihydrate to form a panel comprising a gypsum core comprising calcium sulfate dihydrate; and drying the panel and cutting the panel into a gypsum board having one or more pre-determined dimensions.

Clause 18. The method of clause 17, wherein a first portion of the gypsum slurry is disposed in an unfoamed state as a high-density region in layer form contacting the front cover sheet and a second portion of the gypsum slurry is disposed in a foamed state as a low-density region contacting the high-density region, the high-density region having a higher density than the low-density region; and wherein the board core comprises a set low-density region comprising calcium sulfate dihydrate and a set high-density region comprising calcium sulfate dihydrate, the set high-density region being interposed as a layer between the set low-density region and the front cover sheet.

Clause 19. The method of clause 17, wherein at least one of the front cover sheet and the back cover sheet comprises a glass mat facer sheet or a paper facer sheet.

Clause 20. The method of clause 17, wherein the low density region has a total air volume of about 45 vol. % to about 80 vol. %.

Clause 21. The method of clause 17, wherein the high density region has a total void volume of about 30 vol. % or less.

Clause 22. The method of clause 17, wherein the high density region has a total void volume of about 10 vol. % or less.

Clause 23. A gypsum board made by the method of clause 17.

Clause 24. A gypsum board made by the setting a composition comprising a slurry comprising a mixture of:

water;

particles comprising calcium sulfate hemihydrate;

set stabilizer particles of any of clauses 1 to 10;

optionally a retarder, preferably the retarder comprises sodium citrate.

The following examples further illustrate the invention but, of course, should not be construed as in any way limiting its scope.

EXAMPLES

In the following examples, gypsum slurry was made by mixing 400 g calcium sulfate hemihydrate, 400 g water and 20 g set accelerator (set stabilizer particles). The slurry density was controlled by adding foam to the mixer. The foam was made in foam generator and was added at a constant flow rate for exactly 7 seconds. After mixing the hemihydrate, set accelerator, water and foam in a mixer with a paddle for a total of 20 seconds, the slurry was poured into ½" thick disks with 4" diameter. Four disks were cast at every condition. The disks were allowed to dry overnight at 110° F. to get to constant weight. The amount of foam added within 7 seconds gives a dry density of 28 lb/ft³ when the slurry is set and dried given that all the foam survive during mixing with the slurry. If some of the foam burst during mixing, the dry density will be higher. The disks were weighed to measure the average dry density.

Example 1

As comparative examples, three different types of calcium sulfate hemihydrate were made in the laboratory by calcining calcium sulfate dihydrate from different sources (Type A, B and C) at 350° F. for 40 minutes.

Type A: The calcium sulfate dihydrate was a dried synthetic gypsum without any reclaimed waste that contains a hydrophobic agent (siloxane)(control sample).

Type B: The calcium sulfate dihydrate was obtained by grinding a piece of drywall that does not contain any hydrophobic agent Type C: The calcium sulfate dihydrate was obtained by grinding a piece of drywall that contains about 0.7 wt % siloxane-based hydrophobic agent.

The densities of the Type A, Type B and Type C blends including calcium sulfate hemihydrate that were respectively obtained by calcining the Type A, Type B and Type C sources of calcium sulfate dihydrate are shown in Table 3.

TABLE 3

| Calcium Sulfate hemihydrate blend | Dry density (lb/ft³) |
| --- | --- |
| 95 wt % Type A and 5 wt % Type B (control sample) | 27.7 |
| 95 wt % Type A, 4.5 wt % Type B and 0.5 wt % Type C | 29.0 |
| 95 wt % Type A and 5% Type C | 35.1 |

The results show the effect of using a waste board that contains a hydrophobic agent (siloxane in the example) on the foam and final density. The addition of siloxane-containing waste caused the density to increase by partially damaging the foam during mixing. The set accelerator used in the experiment described above for comparative examples was the control set accelerator made by grinding gypsum (that does not contain Siloxane-containing waste) and 5 wt % Dextrose.

Example 2

Also, a set accelerator (set stabilizer particles) of the invention was made by grinding a board that contains 0.7 wt % siloxane-based hydrophobic agent with 5 wt % Dextrose in a ball mill for 10 minutes. When the set accelerator in the above comparative examples was replaced with the set accelerator (set stabilizer particles) described in this invention, the dry density was found to be 27.9 lb/ft³ which is about the same as the control sample made without siloxane-containing waste and also similar to the target density of 28 lb/ft³. This proved that when the siloxane-containing waste is ground with a suitable grinding aid (dextrose in the example) to make a set accelerator that is used to make a gypsum board, the siloxane-containing waste does not impact the foam.

The invention provides and uses a set-stabilized calcium sulfate hemihydrate cement or plaster which contains seed crystals of calcium sulfate dihydrate protected against loss of their water of hydration as a result of heating, and an equivalent amount of retarder, so as to produce a plaster the setting time of which is not subject to change on storage in the presence of heat or upon the adventitious admixture of accelerating or retarding influences, and for such a plaster the inventor claims.

Advantageously, the methods described herein allow reclamation of otherwise unsuitable gypsum materials for reuse in new products. In particular, gypsum particles, even upon being size-reduced, may still contain and be coated in the one or more of the hydrophobic additives present in the solid layer from which the particles were formed which herein before now has posed incompatible for incorporation into an aqueous gypsum slurry for drywall manufacture, particularly in drywalls comprising foam components. Previous attempts have revealed that hydrophobic-containing gypsum particles break the walls of air bubbles, resulting in loss of slurry stability.

In particular, gypsum drywall comprising hydrophobic components, that would otherwise be discarded, may be recycled into new drywall having properties that conform to ASTM standard C1396/C1396M-17. Various properties such as flexural strength, hardness (core, end, and edge), nail pull resistance, humidified deflection, end squareness, nominal thickness, recessed- or tapered-edge depth, width, length, water resistance of core-treated water repellant gypsum panel products, and surface water resistance of gypsum panel products with water-repellent surfaces, may be determined such as described in ASTM C473-19.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a–b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more of the element that it introduces.

We claim:

1. A plurality of set stabilizer particles comprising:
a particle core comprising 50 to 98 wt. % calcium sulfate dihydrate, and less than 3 wt. % siloxane, and
a coating on the particle core, the coating comprising a dehydration-preventing substance selected from the group consisting of sugars, dextrins, and polyhydroxy alcohols at a ratio of about 5 to 25 parts by weight of dehydration-preventing substance per 100 parts by weight of calcium sulfate dihydrate, wherein the set stabilizer particles have a particle distribution with a Dv50 particle size of about 10 μm to about 60 μm and a particle surface area of 5000 to 15000 cm²/gm.

2. The set stabilizer particles of claim 1, wherein the dehydration-preventing substance comprises a hexose sugar.

3. The set stabilizer particles of claim 1, wherein the dehydration-preventing substance comprises a corn sugar.

4. The set stabilizer particles of claim 1, wherein the dehydration-preventing substance comprises a glycerol.

5. The set stabilizer particles of claim 1, wherein the dehydration-preventing substance comprises a substance selected from the group consisting of sugars, dextrins and polyhydroxy alcohols.

6. The set stabilizer particles of claim 1, comprising sugar-coated calcium sulfate dihydrate particles.

7. The set stabilizer particles of claim 1, wherein the set stabilizer particles comprise about 0.05 wt. % to less than 3 wt. % said siloxane.

8. A method for making the set stabilizer particles of claim 1, comprising:
applying to feed particles of waste gypsum board material, comprising 50 to 98 wt. % calcium sulfate dihydrate and less than 3 wt. % siloxane, a dehydration-preventing substance selected from the group consisting of sugars, dextrins, and polyhydroxy alcohols at a ratio of about 5 to 25 parts by weight of dehydration-preventing substance per 100 parts by weight of calcium sulfate dihydrate to produce set stabilizer particles.

9. A cementitious powder comprising:
stucco particles comprising calcium sulfate hemihydrate, wherein at least 60 wt. % of the cementitious powder is calcium sulfate hemihydrate; and
0.5-5 wt % the set stabilizer particles of claim 1.

10. The cementitious powder of claim 9, further comprising a retarder.

11. The cementitious powder of claim 9, being a set-stabilized calcium sulfate hemihydrate plaster comprising:
the stucco particles comprising the calcium sulfate hemihydrate,
a retarder, and
the set stabilizer particles, wherein the particle core of the set stabilizer particles comprising the calcium sulfate dihydrate are seed crystals, and
wherein the dehydration-preventing substance of the set stabilizer particles comprises the polyhydroxy alcohol that coats said calcium sulfate dihydrate of the set stabilizer particles and protects said calcium sulfate dihydrate of the set stabilizer particles against loss of water of crystallization.

12. A plaster comprising:
particles comprising calcium sulfate hemihydrate;
the set stabilizer particles of claim 1;
optionally a retarder.

13. A method for using the set stabilizer particles of claim 1 to manufacture a gypsum board comprising:
preparing an aqueous gypsum slurry comprising a mixture of water, stucco and the set stabilizer particles, wherein the stucco comprises calcium sulfate hemihydrate, wherein the aqueous gypsum slurry comprises a mixture of:
at least 60 wt. % said calcium sulfate hemihydrate on a dry water free basis, 0.5-5 wt % the set stabilizer particles, wherein the set stabilizer particles optionally comprise wax,
0 to 5 wt. % on a dry water free basis hydrophobic material selected from wax and/or siloxane other than hydrophobic material selected from said siloxane and optionally wax provided by the set stabilizer particles, and
the water at a weight ratio of water to the calcium sulfate hemihydrate of 0.2:1 to 2:1; and
depositing a front cover sheet, over a forming surface;
depositing the aqueous gypsum slurry over the front cover sheet to form a layer of the aqueous gypsum slurry;
depositing a back cover sheet over the aqueous gypsum slurry;
setting the calcium sulfate hemihydrate to form a panel comprising a gypsum core comprising calcium sulfate dihydrate, wherein the gypsum core has a density of at least 27 lbs/ft³; and
drying the panel and cutting the panel into a gypsum board having one or more pre-determined dimensions.

14. The method of claim 13, wherein a first portion of the aqueous gypsum slurry is disposed in an unfoamed state as a high-density region in layer form contacting the front cover sheet and a second portion of the aqueous gypsum slurry is disposed in a foamed state as a low-density region contacting the high-density region, the high-density region having a higher density than the low-density region; and
wherein the board core comprises a set said low-density region comprising calcium sulfate dihydrate and a set said high-density region comprising calcium sulfate dihydrate, the set high-density region being interposed as a layer between the set low-density region and the front cover sheet.

15. The method of claim 13, wherein at least one of the front cover sheet and the back cover sheet comprises a glass mat facer sheet or a paper facer sheet, wherein the low density region has a total air volume of about 45 vol. % to about 80 vol. %, wherein the high density region has a total void volume of 30 vol. % or less.

16. A gypsum board made by the method of claim 13.

17. A gypsum board made by setting a composition comprising a slurry comprising a mixture of:
water;
particles comprising calcium sulfate hemihydrate;
set stabilizer particles of claim 1; and
optionally a retarder.

* * * * *